(12) United States Patent
Greyson et al.

(10) Patent No.: US 8,158,561 B2
(45) Date of Patent: Apr. 17, 2012

(54) SCALE AND CORROSION INHIBITORS FOR HIGH TEMPERATURE AND PRESSURE CONDITIONS

(75) Inventors: Eric Greyson, North Wales, PA (US); Joseph Manna, Quakertown, PA (US); Somil Chandrakant Mehta, Lansdale, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 12/806,491

(22) Filed: Aug. 13, 2010

(65) Prior Publication Data

US 2011/0046023 A1 Feb. 24, 2011

Related U.S. Application Data

(60) Provisional application No. 61/274,734, filed on Aug. 20, 2009.

(51) Int. Cl.
*C09K 8/52* (2006.01)
*E21B 43/28* (2006.01)
*C02F 5/00* (2006.01)
*C23F 11/08* (2006.01)

(52) U.S. Cl. ............... 507/90; 252/175; 252/389.21; 252/389.22; 507/235; 507/236; 507/239; 507/939

(58) Field of Classification Search ............... 507/90, 507/235, 236, 239, 939; 252/175, 389.21, 252/389.22
See application file for complete search history.

(56) References Cited

U.S. PATENT DOCUMENTS

| 4,526,728 | A | 7/1985 | Finke et al. |
| 4,650,591 | A | 3/1987 | Boothe et al. |
| 4,717,543 | A * | 1/1988 | Sherwood et al. ............... 422/15 |
| 5,512,183 | A | 4/1996 | Boyette et al. |
| 5,519,102 | A | 5/1996 | Cady et al. |
| 5,594,084 | A | 1/1997 | Boyette et al. |
| 7,452,487 | B2 | 11/2008 | Kanzaki et al. |
| 2005/0082793 | A1 | 4/2005 | Lee |
| 2007/0120094 | A1* | 5/2007 | Yang et al. ................. 252/389.2 |
| 2007/0287858 | A1 | 12/2007 | Dabdoub |

FOREIGN PATENT DOCUMENTS

| EP | 0132630 A2 | 2/1985 |
| EP | 0516346 B1 | 4/1997 |
| WO | 2007/006648 A1 | 1/2007 |

* cited by examiner

*Primary Examiner* — Timothy J. Kugel
(74) *Attorney, Agent, or Firm* — Marcella M. Bodner

(57) ABSTRACT

The present invention relates to a method for inhibiting scale and corrosion in aqueous systems, for example, under high temperature and pressure conditions such as temperatures up to 250° C. and/or pressures up to 10000 psi (i.e., about 68.9 MPa). The method involves providing polymer compositions comprising 1% to 100% by weight of a phosphorus-containing amide monomer to such aqueous systems, which arise, for example, in connection with oilfield operations and some water treatment applications.

14 Claims, No Drawings

SCALE AND CORROSION INHIBITORS FOR HIGH TEMPERATURE AND PRESSURE CONDITIONS

This application claims the benefit of priority under 35 U.S.C. §119(e) of U.S. Provisional Patent Application No. 61/274,734 filed on Aug. 20, 2009.

FIELD OF THE INVENTION

The present invention relates to a method for inhibiting scale and corrosion in aqueous systems under high temperature and pressure conditions. The method involves providing polymer compositions comprising 1% to 100% by weight of a phosphorus-containing amide monomer.

BACKGROUND OF THE INVENTION

Many phosphorus-containing low molecular weight compounds and polymers are known to be useful corrosion inhibitors for water treatment applications, such as in cooling towers and boilers. See, for example, U.S. Patent Publication No. 2007/0287858. (Poly)isopropenylphosphonic acid and its variants are also useful for scale inhibition. See, for example, U.S. Pat. Nos. 5,512,183, 5,519,102 and 5,594,084, as well as U.S. Patent Publication No. 2005/082793.

Thus, polymers made from phosphoalkyl (meth)acrylate monomers, which are esters, are well known for their scale and corrosion inhibiting properties. However, the carbonyl ester bonds of the phosphoalkyl (meth)acrylate-containing polymers undergo notable deterioration under high temperature conditions (i.e., even below 100° C.) because the ester bond is often not stable under such conditions. See International Journal of Chemical Kinetics, vol 22(5), pp 431, 2004 and Macromolecules, vol 31(23), pp. 8063, 1998. On the other hand, the amide bond of phosphoalkyl (meth)acrylamide-containing polymers should be stable up to much higher temperatures (i.e. more than 250° C.). See, Polymer Degradation and Stability, vol 91, pp. 21, 2006. It is common knowledge that the amides have higher hydrolytic stability than the esters under wider pH and temperature conditions, including room temperature and much higher. Water treatment and oil field applications, for example, often present high temperatures such as up to 250° C. (see The Chemical Treatment of Boiler Water, pp. 140, Chemical Publishing Co., 1981) and/or pressure conditions such as up to 10000 pounds per square inch (psi) (i.e., about 68.9 MPa) (see Oilfield Water Technology, pp. 14, NACE International, 2006). Thus, a novel polymeric scale and corrosion inhibitor that provides robust performance in such extreme conditions in aqueous or organic solvent solutions is required.

Many (meth)acrylamide phosphorus monomers and polymers have been developed for successful application in adhesives, coatings and anti-corrosive films. See, European Patent No. EP 0516346 B1 and International Patent Application Publication No. WO 2007/006648 A1.

Additionally, phosphonated amide monomers having high electrolytic group density and improved conductivity are disclosed in U.S. Pat. No. 7,452,487 for use in conductive resins, proton-conductive polymer electrolyte membranes and coating agents.

However, no one has recognized the benefits to be obtained by using phosphorus-containing amide-based polymers in high temperature and/or pressure conditions such as water treatment and oilfield applications.

Polymer chemistry with a combination of pendant carboxylate and phosphate/phosphonate groups, for example polymers comprising phosphoalkyl (meth)acrylamide monomers, should perform well as both scale and corrosion inhibitor. The present invention provides such polymers which should demonstrate both corrosion and scale inhibition properties in single polymer chemistry with good thermal and pressure stability.

SUMMARY OF THE INVENTION

The present invention provides a method for inhibiting corrosion of metal in contact with an aqueous system and/or inhibiting scale formation in the aqueous system, said method comprising adding to the aqueous system an effective amount of a polymer composition comprising polymerized units derived from 1% to 100%, by weight, of a phosphorus-containing amide monomer having the general formula:

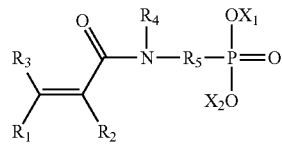

wherein $X_1$, $X_2$ are each, individually, hydrogen, linear or branched $C_1$-$C_4$ alkyl groups, aryl groups, nitrogen-containing groups, or metal ions; $X_1$ and $X_2$ together may be a multivalent metal atom, or $X_1$ and $X_2$ may be linked together to form a cyclic structure; $R_1$, $R_2$, $R_3$, $R_4$ are each, individually, hydrogen, linear or branched $C_1$-$C_4$ alkyl groups, aryl groups, and combinations thereof; and $R_5$ is absent, or $R_5$ is linear or branched $C_1$-$C_{20}$ alkyl groups, aryl groups, ethylene oxide residue, propylene oxide reside, or combinations thereof; or $R_5$ is —$R_6$—O—, where $R_6$ is either absent or, when it is present, it is linear or branched $C_1$-$C_{20}$ alkyl groups, aryl groups, ethylene oxide residue, propylene oxide reside, or combinations thereof. The weight percent is based on the total weight of said polymer composition and the weight percents of all components totals 100%, and wherein said polymer composition has a weight average molecular weight of between 1,000 and 200,000 grams/mole.

The aqueous system may have a temperature up to 250° C., a pressure up to 10000 psi (i.e., about 68.9 MPa), or both. The aqueous system may be part of, derived from, or comprises oilfield operations.

In one embodiment, the phosphorus-containing amide monomer compound comprises a phosphonated amide monomer having the following general formula:

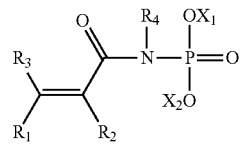

wherein $X_1$, $X_2$ are each, individually, hydrogen, linear or branched $C_1$-$C_4$ alkyl groups, aryl groups, nitrogen-containing groups, or metal ions; $X_1$ and $X_2$ together may be a multivalent metal atom, or $X_1$ and $X_2$ may be linked together to form a cyclic structure; and $R_1$, $R_2$, $R_3$, $R_4$ are each, individually, hydrogen, linear or branched $C_1$-$C_4$ alkyl groups, aryl groups, and combinations thereof.

In another embodiment, the phosphorus-containing amide monomer compound has the following general formula:

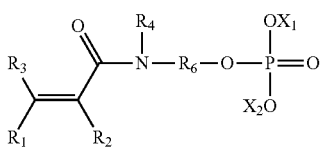

wherein $X_1$, $X_2$ are each, individually, hydrogen, linear or branched $C_1$-$C_4$ alkyl groups, aryl groups, nitrogen-containing groups, or metal ions; $X_1$ and $X_2$ together may be a multivalent metal atom, or $X_1$ and $X_2$ may be linked together to form a cyclic structure; $R_1$, $R_2$, $R_3$, $R_4$ are each, individually, hydrogen, linear or branched $C_1$-$C_4$ alkyl groups, aryl groups, or combinations thereof; and $R_6$ is linear or branched $C_1$-$C_{20}$ alkyl groups, aryl groups, or ethylene oxide residue, or propylene oxide reside, or combinations thereof.

In still another embodiment, the phosphorus-containing amide monomer compound comprises a methacrylamide phosphonic acid, or salt thereof, having the following general formula:

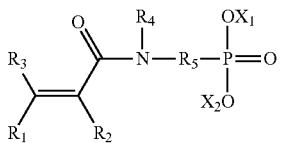

wherein $X_1$, $X_2$ are each, individually, hydrogen, linear or branched $C_1$-$C_4$ alkyl groups, aryl groups, nitrogen-containing groups, or metal ions; $X_1$ and $X_2$ together may be a multivalent metal atom, or $X_1$ and $X_2$ may be linked together to form a cyclic structure; $R_1$, $R_2$, $R_3$, $R_4$ are each, individually, hydrogen, linear or branched $C_1$-$C_4$ alkyl groups, aryl groups, or combinations thereof; and $R_5$ is linear or branched $C_1$-$C_{20}$ alkyl groups, aryl groups, or combinations thereof.

The polymer composition may further comprise: b) 0% to 50% by weight of a phosphorus-containing amide diester monomer; c) 0% to 99% by weight of one or more monoethylenically unsaturated monocarboxylic acid and salts thereof; d) 0% to 90% by weight of one or more monoethylenically unsaturated dicarboxylic acid and their salts and anhydrides; e) 0% to 90% by weight of one or more sulfonated strong acid monomers and salts thereof; f) 0% to 90% by weight of one or more non-amide phosphonated monomers; g) 0% to 75% by weight of one or more monoethylenically unsaturated non-ionic monomers, and h) 0% to 50% by weight of one or more unsaturated cationic monomers.

The effective amount of the polymer composition may be from 1 to 10,000 parts per million.

The aqueous system may comprise a water treatment boiler wherein the polymer composition inhibits iron oxide scale and/or corrosion and/or disperses particulates. The aqueous system may be part of oilfield operations wherein the polymer composition inhibits formation of sulfide precipitate. The aqueous system may comprises high calcium brine completion fluids being used in oilfield operations wherein the polymer composition inhibits scale formation. The aqueous system may be involved in operations selected from the group consisting of: water treatment cooling towers, water treatment boilers, and oilfield operations, wherein the polymer composition inhibits corrosion and scale formation. The aqueous system may be part of oilfield operations involving aqueous drilling mud which comprises clay wherein the polymer composition disperses the clay in the aqueous drilling mud.

DETAILED DESCRIPTION OF THE INVENTION

A "polymer," as used herein and as defined by F W Billmeyer, JR. in *Textbook of Polymer Science*, second edition, 1971, is a relatively large molecule made up of the reaction products of smaller chemical repeat units. Polymers may have structures that are linear, branched, star shaped, looped, hyperbranched, crosslinked, or a combination thereof; polymers may have a single type of repeat unit ("homopolymers") or they may have more than one type of repeat unit ("copolymers"). Copolymers may have the various types of repeat units arranged randomly, in sequence, in blocks, in other arrangements, or in any mixture or combination thereof. Chemicals that react with each other to form the repeat units of a polymer are known herein as "monomers," and a polymer is said herein to be made of, or comprise, "polymerized units" of the monomers that reacted to form the repeat units. The chemical reaction or reactions in which monomers react to become polymerized units of a polymer, whether a homopolymer or any type of copolymer, are known herein as "polymerizing" or "polymerization."

As used herein, the prefix "(meth)acryl-" means "methacryl- or acryl-."

Polymer molecular weights can be measured by standard methods such as, for example, size exclusion chromatography (also called gel permeation chromatography) or intrinsic viscosity.

Endpoints of ranges are considered to be definite and are recognized to incorporate within their tolerance other values within the knowledge of persons of ordinary skill in the art, including, but not limited to, those which are insignificantly different from the respective endpoint as related to this invention (in other words, endpoints are to be construed to incorporate values "about" or "close" or "near" to each respective endpoint). The range and ratio limits, recited herein, are combinable. For example, if ranges of 1-20 and 5-15 are recited for a particular parameter, it is understood that ranges of 1-5, 1-15, 5-20, or 15-20 are also contemplated and encompassed thereby.

As used herein, the terms "phosphorus-containing amide monomers" and "phosphorus-containing amide monomer compounds" are synonymous and mean amide monomer compounds which are phosphated or phosphonated. More particularly, in phosphorus-containing amide monomers, the phosphorus atom is bound directly or indirectly with the nitrogen atom of the amide compound, and one or more oxygen atoms are bound directly to the phosphorus atom. Phosphorus-containing amide monomers suitable for use in the present invention have the following general formula:

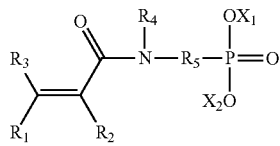

wherein $X_1$, $X_2$ are each, individually, hydrogen, linear or branched $C_1$-$C_4$ alkyl groups, aryl groups, nitrogen-containing groups, or metal ions; $X_1$ and $X_2$ together may be a multivalent metal atom, or $X_1$ and $X_2$ may be linked together to form a cyclic structure; $R_1$, $R_2$, $R_3$, $R_4$ are each, individually, hydrogen, linear or branched $C_1$-$C_4$ alkyl groups, aryl groups, and combinations thereof; $R_5$ is either absent, or $R_5$ is linear or branched $C_1$-$C_{20}$ alkyl groups, aryl groups, ethylene oxide residue, propylene oxide reside, or combinations thereof, or $R_5$ is —$R_6$—O—, where $R_6$ is either absent or, when it is present, it is linear or branched $C_1$-$C_{20}$ alkyl groups, aryl groups, ethylene oxide residue, propylene oxide residue, or combinations thereof. The nitrogen-containing groups may, for example, be an amine or ammonium, and the metal ions may be, but are not limited to, one or more of Na, Mg, Al, Ca and K. The cyclic structure formed when $X_1$ and $X_2$ are linked together may, for example, follow the formula

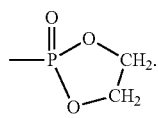

More particularly, the present invention provides a method for inhibiting corrosion of metal in contact with an aqueous system and/or inhibiting scale formation in the aqueous system, at high temperatures and pressures. The method comprises adding to the aqueous system an effective amount of a polymer composition comprising from 1% to 100%, by weight, of a phosphorus-containing amide monomer. The polymer composition may also comprise from 0% to 50% by weight of a phosphorus-containing diamide monomer, and from 0% to 99% of one or more monoethylenically unsaturated monocarboxylic acids and salts thereof, as well as other optional components, as discussed in further detail hereinafter.

The aqueous systems may have temperatures up to 250° C. and/or pressures up to 10000 psi (i.e., about 68.9 MPa). Such conditions are routinely encountered, for example, without limitation, during oilfield operations which include activities and processes for exploration and production of crude oil and its derivatives. For example, exploration often involves the initial drilling of wells and pumping large quantities of water into the ground, which commensurately generates large quantities of "formation water." Production often involves, but is not limited to "completion" which is performed after drilling and casing the well and enables the well to produce crude oil thereafter. The aqueous system to be treated in accordance with the method of the present invention may be part of, derived from, or comprise oilfield operations.

More particularly, the aqueous system may comprise a water treatment boiler wherein the polymer composition inhibits iron oxide scale and/or corrosion and/or disperses particulates. The aqueous system may be part of oilfield operations wherein the polymer composition inhibits formation of sulfide precipitate. The aqueous system may comprises high calcium brine completion fluids being used in oilfield operations wherein the polymer composition inhibits scale formation. The aqueous system may be involved in operations selected from the group consisting of: water treatment cooling towers, water treatment boilers, and oilfield operations, wherein the polymer composition inhibits corrosion and scale formation. The aqueous system may be part of oilfield operations involving aqueous drilling mud which comprises clay wherein the polymer composition disperses the clay in the aqueous drilling mud.

Since (meth)acrylate-based polymers are known to provide scale inhibition in aqueous systems, and polymers containing pendant phosphorus groups are known corrosion inhibitors for aqueous systems in contact with metal surfaces, polymers comprising phosphoalkyl (meth)acrylamide monomers should provide a single polymer composition having combined scale and corrosion inhibition properties. However, polymers comprising units derived from phosphoalkyl (meth)acrylate monomers, which are esters, are also known to deteriorate under the high temperature and/or pressure conditions (for example, such as, up to 250° C. and up to 10000 psi (i.e., about 68.9 MPa), respectively) found in some water treatment and oilfield operations. Thus, it is believed that using phosphorus-containing (meth)acrylamide monomers, which have an amide bond, rather than the less stable ester bond of the phosphoalkyl (meth)acrylates, will successfully produce polymers having pendant phosphorus containing groups that are suitable for inhibiting scale formation and corrosion in aqueous systems at high temperatures such as up to 250° C. and/or pressures up to 10000 psi (i.e., about 68.9 MPa). Without being bound by theory, it is believed that replacing the ester bond with an amide bond will lead to significant improvement in thermal and hydrolytic stability as well as providing good inorganic scale inhibition including, but not limited to, calcium carbonate, calcium sulfate, barium sulfate, barium carbonate, silica, magnesium silicate, iron/zinc sulfide, calcium fluoride, iron oxide, iron carbonate, magnesium hydroxide, phosphate scale inhibition and good thermal stability to temperatures up to, and even in excess of, 250° C. In addition, the phosphorus-containing polymer will show significantly improved corrosion inhibitor properties (presently available acrylate (ester-containing) polymers do not show corrosion inhibition properties).

Such phosphorus-containing amide monomers will make stable polymers with acrylic acid, methacrylic acid, maleic anhydride and other monomers and their salts. The resulting polymers would have a weight average molecular weight between 1,000 and 200,000 grams per mole (g/mol). For example, without limitation, the weight average molecular weight may be 1,000 to 100,000 g/mol, or 2,000 to 50,000 g/mol, or even 2,000 to 15,000 g/mol, or 1,000 to 10,000 g/mol, depending on the particular application.

For example, phosphonated amide monomers, as described in U.S. Pat. No. 7,452,487, wherein $R_5$ is absent and which, therefore, have the following general formula, are suitable for use in accordance with the present invention.

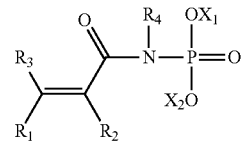

wherein $X_1$, $X_2$ are each, individually, hydrogen, linear or branched $C_1$-$C_4$ alkyl groups, aryl groups, nitrogen-containing groups, or metal ions; $X_1$ and $X_2$ together may be a multivalent metal atom, or $X_1$ and $X_2$ may be linked together to form a cyclic structure; and $R_1$, $R_2$, $R_3$, $R_4$ are each, individually, hydrogen, linear or branched $C_1$-$C_4$ alkyl groups, aryl groups, and combinations thereof.

Additionally, phosphorus-containing amide monomers, wherein $R_5$ is —$R_6$—O—, and $R_6$ is linear or branched $C_1$-$C_{20}$ alkyl groups, aryl groups, or ethylene oxide residue, or propylene oxide residue, or a combination thereof, are also suitable for use in accordance with the present invention. Such phosphorus-containing amide monomers have the following general formula:

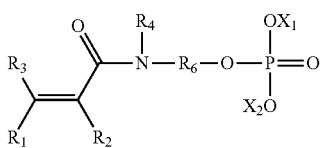

wherein $X_1$, $X_2$ are each, individually, hydrogen, linear or branched $C_1$-$C_4$ alkyl groups, aryl groups, nitrogen-containing groups or metal ions; $X_1$ and $X_2$ together may be a multivalent metal atom, or $X_1$ and $X_2$ may be linked together to form a cyclic structure; $R_1$, $R_2$, $R_3$, $R_4$ are each, individually, hydrogen, linear or branched $C_1$-$C_4$ alkyl groups, aryl groups, or combinations thereof; and $R_6$ is linear or branched $C_1$-$C_{20}$ alkyl groups, aryl groups, or ethylene oxide residue, or propylene oxide residue, or a combination thereof.

Furthermore, methacrylamide phosphonic acids (i.e., phosphonates of methacrylamide) and salts thereof, wherein $R_5$ is present and there are only three oxygen atoms bound to the phosphorus atom, are also suitable for use in accordance with the present invention.

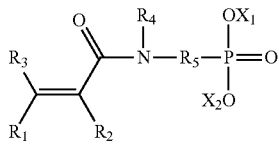

wherein $X_1$, $X_2$ are each, individually, hydrogen, linear or branched $C_1$-$C_4$ alkyl groups, aryl groups, nitrogen-containing groups, or metal ions; $X_1$ and $X_2$ together may be a multivalent metal atom, or $X_1$ and $X_2$ may be linked together to form a cyclic structure; $R_1$, $R_2$, $R_3$, $R_4$ are each, individually, hydrogen, linear or branched $C_1$-$C_4$ alkyl groups, aryl groups, or combinations thereof; and $R_5$ is linear or branched $C_1$-$C_{20}$ alkyl groups, aryl groups, or combinations thereof.

In addition to phosphorus-containing amide monomers, the polymers suitable for use in accordance with the present invention may further comprise diamides of the following structure:

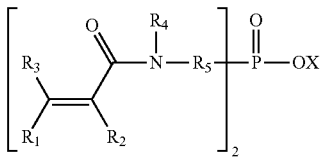

wherein $R_1$, $R_2$, $R_3$, and $R_4$ are hydrogen or linear or branched $C_1$-$C_4$ alkyl groups, or combinations thereof; X is hydrogen or linear or branched $C_1$-$C_{10}$ alkyl groups, a nitrogen containing group (such as amine) or metal ions including, but not limited to, Na, Mg, Al, Ca, K, etc.; and $R_5$ is either absent, or $R_5$ is linear or branched $C_1$-$C_{20}$ alkyl groups, aryl groups, ethylene oxide residue, propylene oxide reside, or combinations thereof, or $R_5$ is —$R_6$—O—, where $R_6$ is either absent or, when it is present, it is linear or branched $C_1$-$C_{20}$ alkyl groups, aryl groups, ethylene oxide residue, propylene oxide reside, or combinations there of.

Suitable monoethylenically unsaturated monocarboxylic acids include, but are not limited to: acrylic acid, methacrylic acid, $C_3$ to $C_6$ monocarboxylic acid and salts thereof, and combinations thereof.

In addition to component (a) phosphorus-containing amide monomers, optional component (b) phosphorus-containing diamide monomers, and, optional component (c) monoethylenically unsaturated monocarboxylic acid monomer and its salt, the polymer composition of the present invention may also, optionally, comprise d) 0% to 90% by weight of one or more monoethylenically unsaturated dicarboxylic acid monomers (e.g., maleic acid) and salts and anhydrides thereof, e) 0% to 90% by weight of one or more sulfonated strong acid monomers and salts thereof, f) 0% to 90% by weight of one or more non-amide phosphonic acids and salts thereof, g) 0% to 75% by weight of one or more monoethylenically unsaturated non-ionic monomers; and h) 0% to 50% by weight of one or more unsaturated cationic monomers.

In particular, the monoethylenically unsaturated dicarboxylic acids and their salts and anhydrides include, but are not limited to: maleic acid, $C_4$ to $C_8$ dicarboxylic acid and salts thereof, and combinations thereof.

Furthermore, suitable sulfonated strong acid monomers include, but are not limited to: 1-acrylamido-1-propanesulfonic acid, 2-acrylamido-2-propanesulfonic acid, 2-acrylamido-2-methyl-1-propanesulfonic acid, 2-methacrylamido-2-methyl-1-propanesulfonic acid, 3-methacrylamido-2-hydroxypropanesulfonic acid, allyl sulfonic acid, methallylsulfonic acid (also known as 2-methyl-2-propene-1-sulfonic acid), allyloxybenzenesulfonic acid, methallyloxybenzenesulfonic acid, 2-hydroxy-3-(2-propenyloxy)-propanesulfonic acid, styrenesulfonic acid, vinylsulfonic acid, 3-sulfopropylacrylate, 3-sulfopropylmethacyrlate, sulfomethacrylamide, sulfomethylmethacrylamide, and water-soluble salts of the foregoing acids. Particular examples of sulfonated strong acid monomers include 2-acrylamido-2-methyl-1-propanesulfonic acid, 2-methacrylamido-2-methyl-1-propanesulfonic acid, and water soluble salts thereof, and combinations thereof.

The non-amide phosphonic monomers suitable for use in the method of the present invention include, but are not limited to: isopropenylphosphonic acid, vinylphosphonic acid, isopropenylphosphonic anhydride, allylphosphonic acid, ethylidenediphosphonic acid, vinylbenzenephosphonic acid, 3-allyloxy-2-hydroxypropylphosphonic acid, and water soluble salts thereof, and combinations thereof.

Suitable monoethylenically unsaturated non-ionic monomers include, but are not limited to: N-tert-butyl-acrylamide (TBAm), styrene, α-methyl styrene, $C_1$ to $C_4$ alkyl esters of (meth)acrylic acid, $C_1$ to $C_4$ hydroxyalkyl esters of (meth)acrylic acid, acrylamide, N,N-dialkyl substituted acrylamides, and combinations thereof.

Suitable unsaturated cationic monomers include, but are not limited to, the group consisting of quaternary ammonium compounds such as (meth)acrylamidoalkyltrialkylammonim quaternary compounds, diallyldialkylammonium quaternary compounds, and mixtures thereof; diallyldialkylammonium quaternary compounds; aminoalkyl esters of (meth)acrylic acid such as, 2-(dimethylamino)ethyl methacrylate, 2-(dimethylamino)ethyl acrylate, and 3-dimethylaminopropyl and their salts; quaternized or unquaternized methacrylamidoalkyltrialkylammonium chloride or sulfate or a corresponding acrylate or acrylamide, quaternized or not; quaternized or unquaternized trialkylammonium alkyl alkylacrylate chloride or sulfate, or a corresponding acrylate or acrylamide; and dialkyldiallyl ammonium chloride.

For example, without limitation, polymers comprising 5% to 60%, by weight, phosphoethyl (meth)acrylamide and 40% to 95% by weight (meth)acrylic acid, and which have a molecular weight in the range of 1,000 to 100,000, would be excellent scale and corrosion inhibitors for water treatment and oilfield applications where temperatures are as high as 250° C., or even greater, and pressures reach 10000 psi (i.e., about 68.9 MPa), or even greater.

Polymers compositions useful in the method of the present invention may be produced using any polymerization method, including, for example, solution polymerization, bulk polymerization, heterogeneous phase polymerization (including, for example, emulsion polymerization, suspension polymerization, dispersion polymerization, and reverse-emulsion polymerization), and combinations thereof. Independently, any type of polymerization reaction, including, for example, free radical polymerization, may be used.

When solution polymerization is used, the solvent may be an aqueous solvent (i.e., the solvent is 75% or more water, by weight, based on the weight of the solvent) or an organic solvent (i.e., a solvent that is not aqueous). Some suitable solvents contain, for example, a mixture of water and up to 60% by weight, based on the mixture, of one or more OH-containing solvents, which may be selected from the group consisting of: $C_1$-$C_4$-alkanols; $C_2$-$C_{10}$-alkylene glycols, in which the alkylene chain may be interrupted by one or more non-adjacent oxygen atoms; monoethers of the $C_2$-$C_{10}$-alkylene glycols with $C_1$-$C_4$-alkanols; and mixtures thereof.

Examples of suitable OH-containing solvents are methanol, ethanol, isopropanol, n-butanol, ethylene glycol, diethylene glycol, methyl diglycol, dipropylene glycol; butyl glycol, butyl diglycol, triethylene glycol, the methylethers of said glycols and also oligomers of ethylene oxide containing from 4 to 6 ethylene oxide units, oligomers of propylene oxide containing from 3 to 6 propylene oxide units and also polyethylene glycol-polypropylene glycol cooligomers. Independently, a solvent that contains water may optionally further contain one or more other water-miscible solvents such as, for example, acetone, methyl ethyl ketone, tetrahydrofuran, dioxane, N-methylpyrrolidone, dimethylformamide, etc.

In some embodiments, at least one copolymer is made by free radical polymerization in solution. In some of such embodiments, at least one copolymer is made by free radical solution polymerization in an aqueous solvent.

Typically, polymerization takes place in a reaction vessel. It is contemplated that some or all monomer is added to the reaction vessel while polymerization is occurring. For example, initiator may be added to the reaction vessel prior to monomer, and the conditions of reaction vessel (e.g., temperature, radiation, presence of reactive species, etc.) may be adjusted so that the initiator generates one or more free radicals prior to addition of monomer. For another example, initiator may be added simultaneously with all of or with a portion of one or more monomers. It is also contemplated that initiator may be added both before monomer and also simultaneously with one or more monomer.

In some embodiments, the process for preparing the polymer in accordance with the present invention involves forming a copolymer using one or more free-radical polymerization reactions. Among such embodiments, some involve the use of one or more initiators. An initiator is a molecule or mixture of molecules that, under certain conditions, produces at least one free radical capable of initiating a free-radical polymerization reaction. Some initiators ("thermal initiators") produce such radicals by decomposing when exposed to sufficiently high temperature. Some initiators produce such radicals when certain molecules are mixed together to cause a chemical reaction that results in at least one free radical (such as, for example, some combinations known as "redox" initiators, which contain at least one oxidizing agent and at least one reducing agent). Some initiators ("photoinitiators") produce radicals when exposed to radiation, such as, for example, ultraviolet light or electron beam. Also contemplated are initiators that can be exposed to high temperature simultaneously with the presence of at least one reducing agent, and such initiators may produce free radicals by thermal decomposition, by oxidation-reduction reaction, or by a combination thereof. Additionally, the process may, optionally, involve use of transition metals, such as iron or copper, that can act as polymerization catalysts.

Examples of suitable photoinitiators are azobisisobutyronitrile, benzophenone, acetophenone, benzoin ether, benzyl dialkyl ketones and derivatives thereof.

Of the suitable thermal initiators, some have a decomposition temperature of 20° C. or higher; or 50° C. or higher. Independently, some have decomposition temperature of 180° C. or lower; or 90° C. or lower. Examples of suitable thermal initiators are inorganic peroxo- compounds, such as peroxodisulfates (ammonium and sodium peroxodisulfate), peroxosulfates, percarbonates and hydrogen peroxide; organic peroxo compounds, such as diacetyl peroxide, di-tert-butyl peroxide, diamyl peroxide, dioctanoyl peroxide, didecanoyl peroxide, dilauroyl peroxide, dibenzoyl peroxide, bis(o-tolyl) peroxide, succinyl peroxide, tert-butyl peracetate, tert-butyl permaleate, tert-butyl perisobutyrate, tert-butyl perpivalate, tert-butyl peroctoate, tert-butyl pemeodecanoate, tert-butyl perbenzoate, tert-butyl peroxide, tert-butyl hydroperoxide, cumene hydroperoxide, tert-butyl peroxy-2-ethylhexanoate and diisopropyl peroxydicarbamate; azo compounds, such as 2,2'-azobisisobutyronitrile, 2,2'-azobis (2-methylbutyronitrile), 2,2-azobis(2-methylpropionamidine)-dihydrochloride, and azobis(2-amidopropane) dihydrochloride.

In some embodiments, thermal initiators can optionally be used in combination with reducing compounds. Examples of such reducing compounds are phosphorus-containing compounds, such as phosphorous acid, hypophosphites and phosphinates; sulfur-containing compounds, such as sodium hydrogen sulfite, sodium sulfite, sodium metabisulfite, and sodium formaldehyde sulfoxylate; and hydrazine. It is considered that these reducing compounds, in some cases, also function as chain regulators.

One group of suitable initiators is the group of persulfates, including, for example, sodium persulfate. In some embodiments one or more persulfate is used in the presence of one or more reducing agents, including, for example, metal ions (such as, for example, ferrous ion), sulfur-containing ions (such as, for example, $S_2O_3(=)$, $HSO_3(-)$, $SO_3(=)$, $S_2O_5(=)$, and mixtures thereof), and mixtures thereof.

When initiator is used, the amount of all initiator used, as a weight percentage based on the total weight of all monomers used, is 0.01% or more; or 0.03% or more; or 0.1% or more; or 0.3% or more. Independently, when initiator is used, the ratio of the weight of all initiator used to the total weight of all monomers used is 7% or less; or 3% or less; or 1% or less.

When initiator is used, it may be added in any fashion, at any time during the process. For example, some or all of the initiator may be added to the reaction vessel at the same time that one or more of the monomers are being added to the reaction vessel. In some embodiments, the initiator is added with a constant rate of addition. In other embodiments, the initiator is added with an increasing rate of addition, for example in two or more steps, where each step uses a higher rate of addition than the previous step. In some embodiments, the rate of addition of initiator increases and then decreases.

The process for preparing polymers in accordance with the present invention also involves the use of a chain regulator. A chain regulator is a compound that acts to limit the length of a growing polymer chain. Some suitable chain regulators are, for example, sulfur compounds, such as mercaptoethanol, 2-ethylhexyl thioglycolate, thioglycolic acid, and dodecyl mercaptan. Other suitable chain regulators are the reducing compounds mentioned herein above. In some embodiments, the chain regulator includes sodium metabisulfite. In some embodiments, the amount of chain regulator, as a percentage by weight based on the total weight of all monomers used, is 0.5% or more; or 1% or more; or 2% or more; or 4% or more. Independently, in some embodiments, the amount of chain regulator, as a percentage by weight based on the total weight of all monomers used, is 15% or less; or 10% or less; or 5% or less. In some embodiments, amounts of initiator larger than the amount needed to initiate polymerization can act as a chain regulator.

Other suitable chain regulators are, for example, the OH-containing compounds described hereinabove as suitable for use in a mixture with water to form a solvent. It is contemplated that, in some embodiments, the chain regulator is a component of the solvent and thus the chain regulator may be present in amounts larger than 15% by weight based on the total weight of all monomers used.

Chain regulator may be added to the reaction vessel in any fashion. In some embodiments, the chain regulator is added to the reaction vessel at a constant rate of addition. In some embodiments, the chain regulator is added to the reaction vessel at a rate of addition that increases or decreases or a combination thereof.

For each ingredient that is added to the reaction vessel, that ingredient may be added in pure form. Alternatively, an ingredient that is added to the reaction vessel may be added in the form of a solution in a solvent, in the form of a mixture with one or more other ingredient, or as a combination thereof (i.e., as a mixture with one or more other ingredient, where that mixture is dissolved in a solvent). The form in which any one ingredient is added to the reaction vessel may be chosen independently of the form in which any other ingredient is added to the reaction vessel.

Depending upon the particular application, in accordance with the method of the present invention, an effective amount of the polymer composition comprising polymerized units derived from phosphorus-containing amide monomers is suitably 1 to 10,000 parts per million (ppm), for example 1 to 1,000 ppm, or even 1 to 100 ppm.

For example, in one embodiment of the method of the present invention, the aqueous system comprises a super critical boiler in which iron oxide scale/corrosion tends to occur. Highly pure water is used in such boilers so as to achieve up to 100 cycles of concentration. The total dissolved solids of make up water, which is used to supplement returned condensate and is usually natural water, either in its raw state or treated by some process before use, is usually in the range of 20 parts per billion (ppb). Thus the major source of scale is iron from corrosion products. In such application, polymeric inhibitors/dispersants are used for scale/corrosion prevention. The polymer composition for such an application would comprise at least a) 50% to 80%, by weight, of a phosphorus-containing amide compound, such as 2-methacrylamidoethylphosphoric acid and salts thereof, and c) 20% to 50%, by weight, one or more of a monoethylenically unsaturated monocarboxylic acid and salts thereof, such as methacrylic acid, based on the total weight of the polymer composition, and would inhibit corrosion and/or scale of iron oxide in the water treatment boiler. An example of an effective polymer composition for this application would be a copolymer containing 80% 2-methacrylamidoethylphosphoric acid and salts thereof and 20% (meth)acrylic acid and salts thereof.

In another embodiment, the aqueous system is part of oilfield operations wherein iron oxide/sulfide scale tends to form and corrosion occurs. The presence of $H_2S$ in oil and gas production, accompanied by water, generally results in corrosion with the formation of various forms of iron oxide and sulfide scales. The polymer composition that can specifically control such scales would comprise at least a) 10% to 30%, by weight, of a phosphorus-containing amide compound, such as 2-methacrylamidoethylphosphoric acid and salts thereof, c) 50% to 80%, by weight, one or more of a monoethylenically unsaturated monocarboxylic acid and salts thereof, such as methacrylic acid, and f) 5% to 20%, by weight, of one or more monoethylenically unsaturated non-ionic monomers, such as ethyl acrylate, based on the total weight of the polymer composition, and would inhibit scale formation in the aqueous system of the oilfield operations. An example of an effective polymer composition for this application would be a copolymer containing 20% 2-methacrylamidoethylphosphoric acid and salts thereof, 70% (meth)acrylic acid and salts thereof and 10% ethyl acrylate.

In a further embodiment, the aqueous system is part of oilfield operations wherein high calcium brine completion fluids are being used and, therefore, calcium-based scales tend to form. Completion fluids are usually chloride/bromide/fomate brines of calcium designed to achieve suitable density and flow characteristics to seal off or temporarily plug the face of the producing formation in the well bore so that during the completion and work overoperations fluid and solids in the fluid are not lost to the producing formation. When this fluid comes in contact with formation water already present underground, carbonate/sulfate type scale is usually formed. Due to very high calcium concentration, most inhibitors are dysfunctional in such conditions. However, a polymer composition that may perform under such conditions would comprise at least a) 5% to 40%, by weight, of phosphorus-containing amide compound, such as 2-methacrylamidoethylphosphoric acid and salts thereof, c) 10% to 50% by weight of one or more of a monoethylenically unsaturated monocarboxylic acid and salts thereof, such as methacrylic acid, and e) 50% to 90% by weight of sulfonated strong acid or salts thereof, such as 2-acrylamido-2-methyl-1-propanesulfonic acid (AMPS), based on the total weight of the polymer composition, and would inhibit scale formation in the completion fluids being used in such oilfield operations. An example of an effective polymer composition for this application would be a copolymer containing 15% 2-methacrylamidoethylphosphoric acid or salts thereof, 10% (meth)acrylic acid or salts thereof and 75% AMPS or salts thereof.

In still another embodiment, the aqueous system may be involved in any of the following environments which may or may not high temperature and pressure conditions: water treatment cooling towers, water treatment boilers, oilfield operations, and combinations thereof, wherein there is a tendency for scale formation and corrosion to occur. For example, steel tubings in cooling towers tend to corrode in aqueous environment due to electrochemical processes. In such environment, inorganic (phosphate, zinc, etc) or organic (phosphonate) corrosion inhibitors are used. However, recently there have been limitations on their use due to environmental regulations. As a substitute, an organic polymer corrosion inhibitor may be used, for example, without limitation, a polymer comprising at least a) 10% to 30%, by weight, of phosphorus-containing amide compound, such as 2-methacrylamidoethylphosphoric acid and salts thereof, and c) 70% to 90%, by weight, of one or more of a monoethylenically unsaturated monocarboxylic acid and salts thereof, such as methacrylic acid. An example of effective polymer composition for this application would be a copolymer containing 30% 2-methacrylamidoethylphosphoric acid or salts thereof and 70% (meth)acrylic acid or salts thereof.

In yet another embodiment, the aqueous or organic system is part of oilfield operations wherein drilling mud is being used and, therefore, dispersion of particulates is required. For example, aqueous drilling muds are used while drilling oil wells as a lubricant as well as heat sink. Such muds are often mixtures of liquid and gaseous fluids and solids, which require a suitable dispersant to stabilize homogenous composition. A polymer composition in accordance with the present invention may act as an effective dispersant for such application and would comprise at least a) 1% to 50%, by weight, of a phosphorus-containing amide compound, such as 2-methacrylamidoethylphosphoric acid and salts thereof, c) 40% to 99%, by weight, of a monoethylenically unsaturated monocarboxylic acid and salts thereof, such as methacrylic acid, and optionally e) 10% to 50%, by weight, of a sulfonated strong acid monomer and salts thereof, such as AMPS, based on the total weight of the polymer composition, and would stabilize such muds.

It will be understood that the embodiments of the present invention described hereinabove are merely exemplary and that a person skilled in the art may make variations and modifications without departing from the spirit and scope of the invention. All such variations and modifications are intended to be included within the scope of the present invention.

What is claimed is:

1. A method for inhibiting corrosion of metal in contact with an aqueous system and/or inhibiting scale formation in the aqueous system, said method comprising adding to the aqueous system an effective amount of a polymer composition comprising polymerized units derived from:
    a) 1% to 100%, by weight, of a phosphorus-containing amide monomer having the general formula;

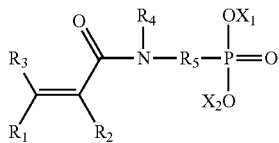

wherein $X_1$, $X_2$ are each, individually, hydrogen, linear or branched $C_1$-$C_4$ alkyl groups, aryl groups, nitrogen-containing groups, or metal ions; $X_1$ and $X_2$ together may be a multivalent metal atom, or $X_1$ and $X_2$ may be linked together to form a cyclic structure; $R_1$, $R_2$, $R_3$, $R_4$ are each, individually, hydrogen, linear or branched $C_1$-$C_4$ alkyl groups, aryl groups, and combinations thereof; and $R_5$ is absent, or $R_5$ is linear or branched $C_1$-$C_{20}$ alkyl groups, aryl groups, ethylene oxide residue, propylene oxide reside, or combinations thereof; or $R_5$ is —$R_6$—O—, where $R_6$ is either absent or, when it is present, it is linear or branched $C_1$-$C_{20}$ alkyl groups, aryl groups, ethylene oxide residue, propylene oxide reside, or combinations thereof;
wherein the weight percent is based on the total weight of said polymer composition and the weight percents of all components totals 100%, and wherein said polymer composition has a weight average molecular weight of between 1,000 and 200,000 grams/mole, and wherein the aqueous system has a temperature up to 250° C., a pressure up to 68.9 MPa, or both.

2. The method according to claim 1, wherein said phosphorus-containing amide monomer compound has the following general formula:

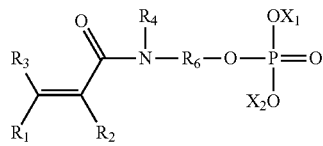

wherein $X_1$, $X_2$ are each, individually, hydrogen, linear or branched $C_1$-$C_4$ alkyl groups, aryl groups, nitrogen-containing groups, or metal ions; $X_1$ and $X_2$ together may be a multivalent metal atom, or $X_1$ and $X_2$ may be linked together to form a cyclic structure;
    $R_1$, $R_2$, $R_3$, $R_4$ are each, individually, hydrogen, linear or branched $C_1$-$C_4$ alkyl groups, aryl groups, or combinations thereof; and $R_6$ is linear or branched $C_1$-$C_{20}$ alkyl groups, aryl groups, or ethylene oxide residue, or propylene oxide reside, or combinations thereof.

3. The method according to claim 2, wherein said phosphorus-containing amide monomer comprises phosphoethyl methacrylamide monoester.

4. The method according to claim 1, wherein said aqueous system is part of, derived from, or comprises oilfield operations.

5. The method according to claim 1, wherein said phosphorus-containing amide monomer compound comprises a phosphonated amide monomer having the following general formula:

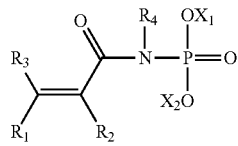

wherein $X_1$, $X_2$ are each, individually, hydrogen, linear or branched $C_1$-$C_4$ alkyl groups, aryl groups, nitrogen-containing groups, or metal ions; $X_1$ and $X_2$ together may be a multivalent metal atom, or $X_1$ and $X_2$ may be linked together to form a cyclic structure; and $R_1$, $R_2$, $R_3$, $R_4$ are each, individually, hydrogen, linear or branched $C_1$-$C_4$ alkyl groups, aryl groups, and combinations thereof.

6. The method according to claim 1, wherein said polymer composition further comprises:
    b) 0% to 50% by weight of a phosphorus-containing amide diester monomer;
    c) 0% to 99% by weight of one or more monoethylenically unsaturated monocarboxylic acid and salts thereof;
    d) 0% to 90% by weight of one or more monoethylenically unsaturated dicarboxylic acid and salts and anhydrides thereof;
    e) 0% to 90% by weight of one or more sulfonated strong acid monomers and salts thereof;
    f) 0% to 90% by weight of one or more non-amide phosphonated monomers;
    g) 0% to 75% by weight of one or more monoethylenically unsaturated non-ionic monomers, and
    h) 0% to 50% by weight of one or more unsaturated cationic monomers.

7. The method according to claim 1, wherein the polymer composition has a weight average molecular weight between 1,000 and 40,000 grams/mole.

8. The method according to claim 1, wherein the effective amount of said polymer composition is from 1 to 10,000 parts per million.

9. The method according to claim 1, wherein said aqueous system comprises a water treatment boiler, and wherein said polymer composition inhibits iron oxide scale and/or corrosion and/or disperses particulates and comprises at least:
    a) 50% to 80%, by weight, of 2-methacrylamidoethylphosphoric acid or its salt; and
    c) 20% to 50%, by weight, of one or more (meth)acrylic acid or its salt.

10. The method according to claim 1, wherein said aqueous system is part of oilfield operations, and wherein said polymer composition inhibits formation of sulfide precipitate and comprises at least:
    a) 10% to 30%, by weight, of 2-methacrylamidoethylphosphoric acid or its salt;
    c) 50% to 80%, by weight, of one or more (meth)acrylic acid or its salt; and
    g) 5% to 20%, by weight, of ethyl acrylate.

11. The method according to claim 1, wherein said aqueous system comprises high calcium brine completion fluids being used in oilfield operations, and wherein said polymer composition inhibits scale formation and comprises at least:
    a) 5% to 40%, by weight, of 2-methacrylamidoethylphosphoric acid or its salt;
    c) 10% to 50% by weight of one or more (meth)acrylic acid or its salt; and
    e) 50% to 90% by weight of 2-acrylamido-2-methyl-1-propanesulfonic acid or its salt.

12. The method according to claim 1, wherein said aqueous system is involved in operations selected from the group consisting of: water treatment cooling towers, water treatment boilers, oilfield operations, and wherein said polymer composition inhibits corrosion and scale formation and comprises at least:
    a) 10% to 30%, by weight, of 2-methacrylamidoethylphosphoric acid or its salt; and
    c) 70% to 90%, by weight, of one or more (meth)acrylic acid or its salt.

13. The method according to claim 1, wherein said aqueous system is part of oilfield operations involving aqueous drilling mud which comprises clay, and wherein said polymer composition disperses the clay in the aqueous drilling mud and comprises at least:
    a) 1% to 50%, by weight, of 2-methacrylamidoethylphosphoric acid or its salt;
    c) 40% to 99%, by weight, of methacrylic acid or its salt; and, optionally,
    e) 10% to 50%, by weight, of 2-acrylamido-2-methyl-1-propanesulfonic acid or its salt.

14. A method for inhibiting corrosion of metal in contact with an aqueous system and/or inhibiting scale formation in the aqueous system, said method comprising adding to the aqueous system an effective amount of a polymer composition comprising polymerized units derived from:
    a) 1% to 100%, by weight, of a phosphorus-containing amide monomer having the following general formula:

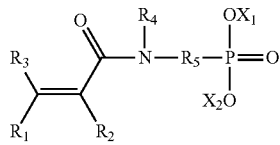

wherein $X_1$, $X_2$ are each, individually, hydrogen, linear or branched $C_1$-$C_4$ alkyl groups, aryl groups, nitrogen-containing groups, or metal ions; $X_1$ and $X_2$ together may be a multivalent metal atom, or $X_1$ and $X_2$ may be linked together to form a cyclic structure; $R_1$, $R_2$, $R_3$, $R_4$ are each, individually, hydrogen, linear or branched $C_1$-$C_4$ alkyl groups, aryl groups, or combinations thereof; and $R_5$ is linear or branched $C_1$-$C_{20}$ alkyl groups, aryl groups, or combinations thereof;
wherein the weight percent is based on the total weight of said polymer composition and the weight percents of all components totals 100%, and wherein said polymer composition has a weight average molecular weight of between 1,000 and 200,000 grams/mole.

* * * * *